United States Patent
Araujo et al.

(10) Patent No.: US 10,498,763 B2
(45) Date of Patent: Dec. 3, 2019

(54) ON-DEMAND INJECTION OF SOFTWARE BOOBY TRAPS IN LIVE PROCESSES

(71) Applicant: International Business Machines Corporation, Armonk, NY (US)

(72) Inventors: Frederico Araujo, White Plains, NY (US); Douglas Lee Schales, Ardsley, NY (US); Marc Philippe Stoecklin, White Plains, NY (US); Teryl Paul Taylor, Danbury, CT (US)

(73) Assignee: International Business Machines Corporation, Armonk, NY (US)

( * ) Notice: Subject to any disclaimer, the term of this patent is extended or adjusted under 35 U.S.C. 154(b) by 153 days.

(21) Appl. No.: 15/691,786

(22) Filed: Aug. 31, 2017

(65) Prior Publication Data

US 2019/0068640 A1 Feb. 28, 2019

(51) Int. Cl.
*H04L 29/06* (2006.01)
*G06F 21/54* (2013.01)
(Continued)

(52) U.S. Cl.
CPC .......... *H04L 63/1491* (2013.01); *G06F 21/53* (2013.01); *G06F 21/54* (2013.01);
(Continued)

(58) Field of Classification Search
CPC . H04L 63/1433; H04L 63/1491; G06F 21/53; G06F 21/54; G06F 8/40; G06F 9/44526; G06F 2221/033
(Continued)

(56) References Cited

U.S. PATENT DOCUMENTS

| 4,685,056 A | 8/1987 | Barnsdale, Jr. et al. |
| 8,468,516 B1 * | 6/2013 | Chen ...................... G06F 8/656 |
| | | 717/170 |

(Continued)

FOREIGN PATENT DOCUMENTS

EP 3171567 A1 5/2017

OTHER PUBLICATIONS

Crane, Stephen, et al. "Booby trapping software." Proceedings of the 2013 New Security Paradigms Workshop. ACM, 2013. (Year: 2013).*

(Continued)

*Primary Examiner* — Syed A Zaidi
(74) *Attorney, Agent, or Firm* — Jeffrey S. LaBaw; David H. Judson (57) ABSTRACT

This disclosure provides for rapid deployments of application-level deceptions (i.e., booby traps) to implant cyber deceptions into running legacy applications both on production and decoy systems, with no downtime and minimal performance overhead compared with the original application. An application-level booby trap is a piece of code injected into an application, and which provides an active defense or deception in response to an attack. A booby trap does not influence program execution under normal operation, and preferably elicits a response that can be defined by a security analyst. In operation, a booby trap is compiled into a bitcode using a patch synthesis process, and it is then injected into a running application, where it is compiled further into machine code, and linked directly with the existing application constructs. The original function also is modified with a function trampoline, and subsequent calls to the original function are then directed to the new function. As easily as a deception (provided by the booby trap) can be (Continued)

deployed, it can be removed easily, thereby leaving no trace in the application.

22 Claims, 9 Drawing Sheets

(51) Int. Cl.
  *G06F 21/53*   (2013.01)
  *G06F 21/56*   (2013.01)
  *G06F 8/40*   (2018.01)
  *G06F 9/445*   (2018.01)

(52) U.S. Cl.
  CPC ........ *G06F 21/566* (2013.01); *H04L 63/1408* (2013.01); *G06F 8/40* (2013.01); *G06F 9/44521* (2013.01); *G06F 9/44526* (2013.01); *G06F 2221/033* (2013.01)

(58) Field of Classification Search
  USPC ........................................................ 726/23
  See application file for complete search history.

(56) References Cited

U.S. PATENT DOCUMENTS

| | | | |
|---|---|---|---|
| 2002/0114422 A1 | 8/2002 | Ishiwaki | |
| 2003/0061254 A1* | 3/2003 | Lindwer | G06F 9/4552 718/1 |
| 2006/0101412 A1* | 5/2006 | Lev | G06F 9/548 717/127 |
| 2010/0333090 A1* | 12/2010 | Wright | G06F 9/45516 718/1 |

OTHER PUBLICATIONS

Portokalidis, Georgios, and Angelos D. Keromytis. "Reassure: A self-contained mechanism for healing software using rescue points." International Workshop on Security. Springer, Berlin, Heidelberg, 2011. (Year: 2011).*

Crane, Stephen J., et al. "It's a TRaP: Table randomization and protection against function-reuse attacks." Proceedings of the 22nd ACM SIGSAC Conference on Computer and Communications Security. ACM, 2015. (Year: 2015).*

* cited by examiner

LISTING 1: SYMBOL ADDRESS RESOLUTION 1  libs ← getLibs (app)
2  for elf ∈ app ∪ libs do
3     smap [ elf ↦ readSymbols (elf) ]
4     if isPic (elf) then
5        baseAddr ← findBaseAddress (elf)
6        relocate (baseAddr, smap)

ON-DEMAND INJECTION OF SOFTWARE BOOBY TRAPS IN LIVE PROCESSES

BACKGROUND

Technical Field

This disclosure relates generally to cyber security.

Background of the Related Art

Today, cyber attackers are breaching corporate networks using a myriad of techniques such as social engineering or water holing. More disturbing is that these attacks can go unnoticed for hundreds of days. These attacks not only enable the exfiltration of important confidential company data, but they also erode client trust. As a consequence, companies can no longer solely rely on perimeter-based defenses—such as intrusion detection systems (IDS) and firewalls—to protect their IT environments. More generally, traditional network traffic monitoring and misuse detection is unable to keep up with evolving attackers, sustains high error rates, and is akin to searching for a needle in an extremely large haystack. As a result, security researchers and companies alike must look inward to gain better visibility at every stage of the cyberattack lifecycle.

Adversaries typically perform initial reconnaissance missions before commencing actual attacks. Unfortunately, today's computer systems (e.g., networks, servers, services, APIs) are too honest and forthcoming in sharing tremendous amounts of information with attackers. Hence, with minimal effort, attackers can glean extremely valuable information on network topologies, currently running applications and their version and patch level, as well as potential vulnerabilities, all without the defender's knowledge. This information asymmetry favors attackers, allowing them to find a single weakness, while defenders are faced with the difficult task of keeping up.

As cyberattacks become more sophisticated there is an increasing need for better ways to detect and stop attackers. Cyber deception has garnered attention by both attackers and defenders as a weapon in the cyber battlefield. The notion of cyber counter-deception refers to the use of planned deceptions to defend information systems against attacker deceptions. Although such second-order deceptions remain largely underutilized in cyber-defensive scenarios, however, they are frequently used by attackers to search for evidence of honeypots, avoid malware analysis, and conceal their presence and identity on exploited systems. In the virtualization domain, malware attacks often employ stealthy techniques to detect virtual machine environments within which they behave innocuously and opaquely while being analyzed by antivirus tools.

Honeypots are closely monitored information systems resources that are intend to be probed, attacked, or compromised, conceived purely to attract, detect, and gather attack information. Traditional honeypots are usually classified per the interaction level provided to potential attackers. Low-interaction honeypots present a façade of emulated services without full server functionality, with the intent of detecting unauthorized activity via easily deployed pseudo-services. High-interaction honeypots provide a relatively complete system with which attackers can interact, and are designed to capture detailed information on attacks. Despite their popularity, both low- and high-interaction honeypots are often detectable by informed adversaries (e.g., due to the limited services they purvey, or because they exhibit traffic patterns and data substantially different than genuine services).

General principles for effective tactical deception in warfare prescribe that deceptions should (1) reinforce enemy expectations, (2) have realistic timing and duration, (3) be integrated with operations, (4) be coordinated with concealment of true intentions, (5) be tailored to contextual requirements, and (6) be imaginative and creative. These rules highlight limitations of current deception-based defenses. For example, conventional honeypots usually violate the third rule of integration as they are often deployed as ad hoc, stand-alone lures isolated from production servers. This makes them easily detectable by most advanced adversaries. They also assume that an adversary must scan the network to identify assets to attack.

There remains an increasing need for counter-deception mechanisms that are capable of tricking and manipulating advanced attacker deceptions.

BRIEF SUMMARY

This disclosure provides for rapid deployments of application-level deceptions (i.e., booby traps) to implant cyber deceptions into running legacy applications both on production and decoy systems, with no downtime and minimal performance overhead compared with the original application. As used herein, an application-level booby trap is a piece of code injected into an application, and which provides an active defense or deception in response to an attack. A booby trap does not influence program execution under normal operation, and preferably elicits a response that can be defined by a security analyst.

The techniques described herein integrate deceptive capabilities into information systems with genuine production value (e.g., servers and software that offer genuine services to legitimate users). In this context, a booby trap is a replacement function for an existing function in an application and preferably performs the same tasks as the original function, but it also includes some deception. In operation, a booby trap is compiled into a bitcode using a patch synthesis process, and it is then injected into a running application or network service, where it is compiled further into machine code, and linked directly with the existing application constructs. The original function also is modified with a function trampoline, and subsequent calls to the original function are then directed to the new function. Furthermore, just as easily as a deception (provided by the booby trap) can be deployed, it can be removed easily, thereby leaving no trace in the application.

The foregoing has outlined some of the more pertinent features of the subject matter. These features should be construed to be merely illustrative. Many other beneficial results can be attained by applying the disclosed subject matter in a different manner or by modifying the subject matter as will be described.

BRIEF DESCRIPTION OF THE DRAWINGS

For a more complete understanding of the subject matter and the advantages thereof, reference is now made to the following descriptions taken in conjunction with the accompanying drawings, in which.

DETAILED DESCRIPTION OF AN ILLUSTRATIVE EMBODIMENT

On-Demand Injection of Software Booby Traps in Live Applications

As will be seen, the approach herein involves injecting deceptions directly into production applications, thereby overcoming some of the key limitations of honeypots and perimeter-based defenses, and ultimately, enabling the cybersecurity system to gather more contextual information useful in tracking, confusing, and denying potential attackers. To enable this solution, and as will be described below, the deception deployment model of this disclosure is transparent to normal users and preserves the application's normal behavior, but it nevertheless ensures that the application deception responds intelligently in the face of an attack. Moreover, the deployment model is able to respond rapidly to the changing threat landscape by injecting booby traps anywhere in the network, even on-demand. Further, the deceptions are easily removable without a trace so as not to tip-off the attacker. The framework does not impair the function or performance for legitimate workloads, nor does it create side channels to alert the attacker of application weaponization.

Figure 1:
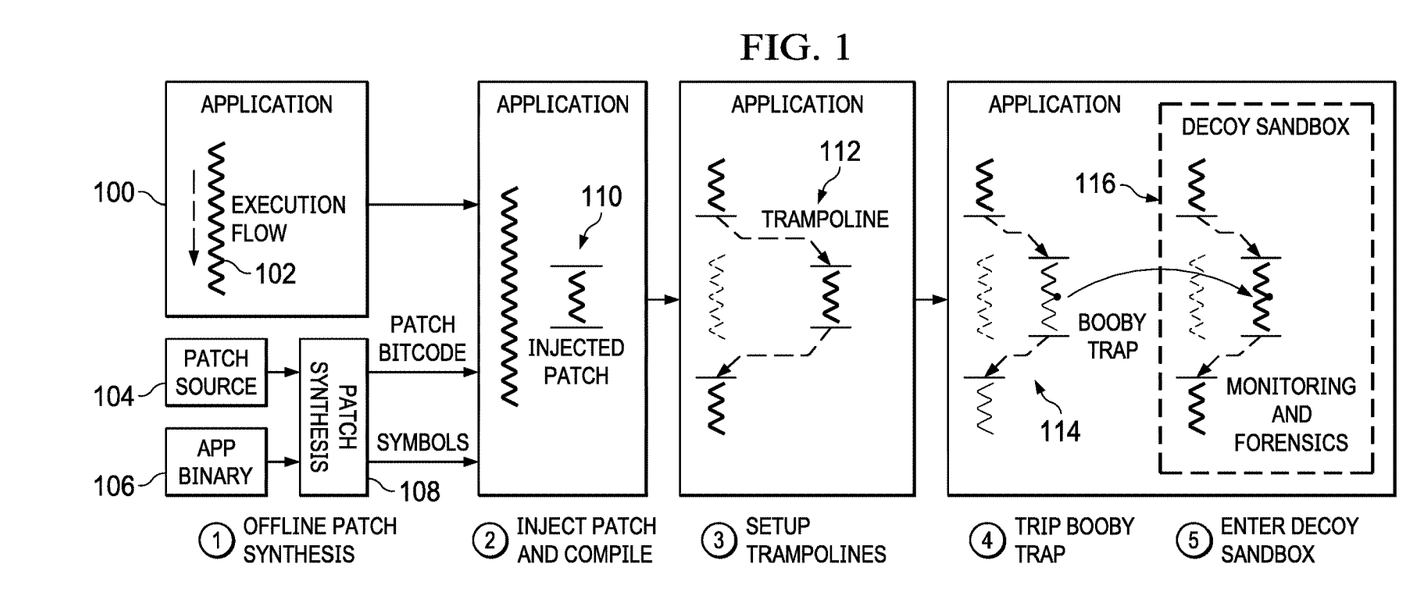
FIG. 1 provides an overview of an on-demand patching workflow according to this disclosure comprising patch synthesis, patch injection with in-memory patch compilation, and function updating via jump instructions injected at the entry point of a target function.

FIG. 1 depicts the basic framework and deception deployment model of this disclosure, which provides for rapid, on-demand application booby trapping. In particular, the drawing depicts a process of injecting a deception into a running target application 100 having one or more execution flows (or paths) 102. Preferably, the process involves an offline step (step (1)), and four online steps, with steps (1) through (3) being used to inject the deception into the running application, followed by a response triggered by that deception as depicted at steps (4) and (5). In particular, at step (1), a booby trapped function (or "patch") is written (synthesized) to replace a function in the running application. To this end, and as will be described in more detail below, a patch source and associated metadata 104, and a binary copy of the application 106 (and its symbols map), are provided to a patch synthesis function 108. The patch is compiled into bitcode, and symbols are extracted from app binary copy 106. As depicted in step (2), once the patch is synthesized by the patch synthesis function 108, it is deployed to the target application 100 and injected into the application's memory space. The patch is then compiled into native code on a separate execution thread 110 inside the process, and it is linked against the global symbols of the application using the symbol mappings from the patch synthesis phase. Next, and at step (3), the process is briefly paused to insert a trampoline 112 from the function that will be replaced with the patch to the patch. The deception is now deployed.

Then, and as depicted at step (4), when an attacker triggers a booby trap 114, the application elicits a user-defined response. The response may be a passive action, such as terminating the connection, collecting the attack payload, and/or notifying a security analyst. Moreover, the response also may be active, such as transparently moving the current execution thread of the application into a decoy sandbox 111 for further execution and in-depth analysis, providing disinformation, or temporarily activating rules to block an IP address. This active response is depicted at step (5).

Thus, the approach depicted in FIG. 1 injects the booby trap into the running application but causes no change to the benign execution flows, while threads tripping over the booby trap 114 preferably are moved into a decoy sandbox 111 for sandboxed and monitored continuation of the process execution.

As noted above, the on-demand injection of a deceptive response preferably is comprised of (1) patch synthesis, (2) patch injection with in-memory patch compilation, and (3) function replacement via trampolines. Each step is discussed in more detail in the following subsections. As will be described, the patch synthesis step preferably takes as inputs the patch source code containing new implementations of functions to be updated and a metadata object describing patch dependencies (i.e., external libraries), and target function names and types. Patch injection and in-memory compilation preferably are handled by a JIT (just-in-time) compiler and program instrumentation runtime components. Function updating preferably is performed by a hooking agent whose responsibility is to redirect the control flow from original to (JIT-compiled) patched functions.

Figure 2:
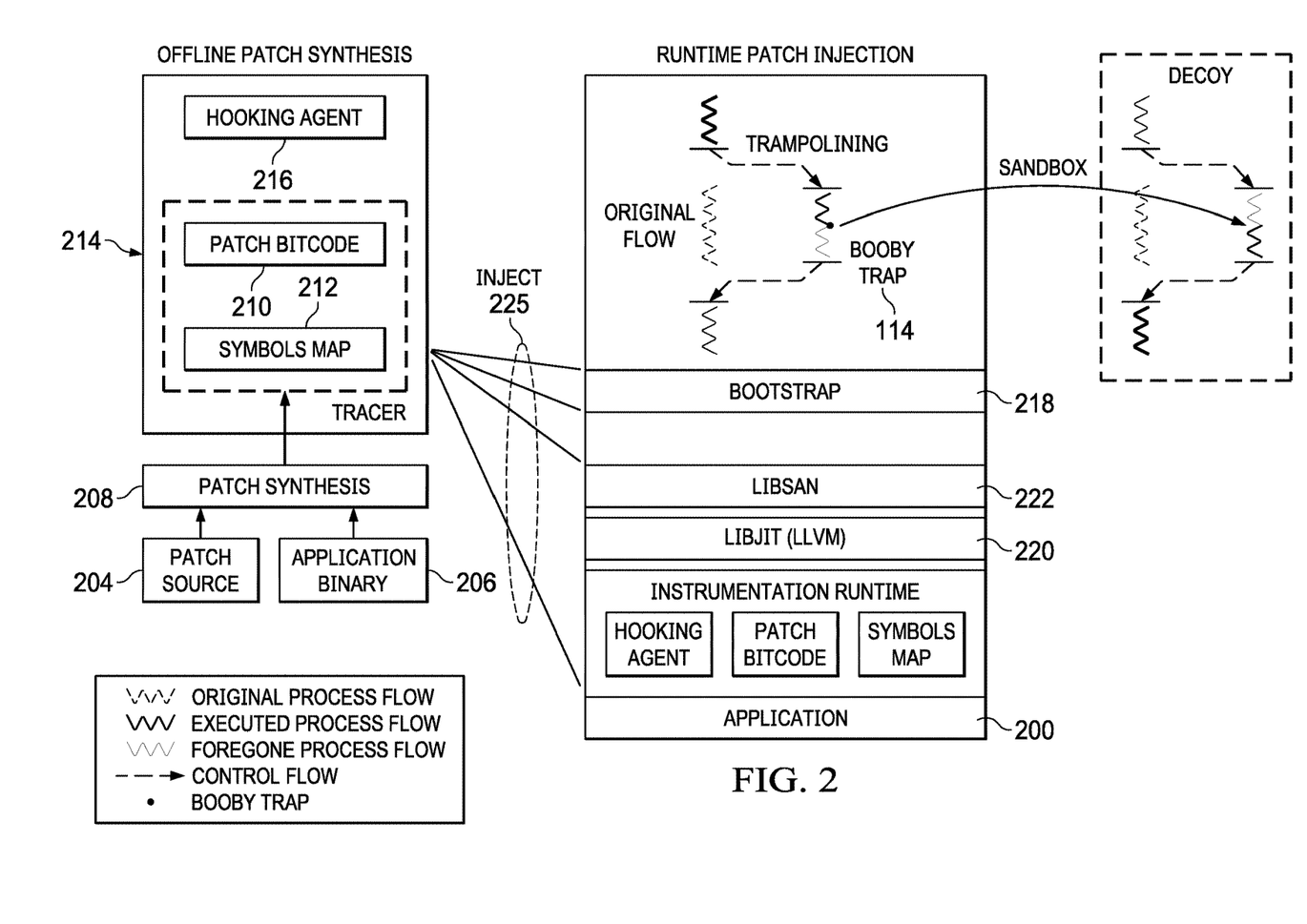
FIG. 2 depicts a block diagram of various components that are used in one embodiment to implement the patch synthesis and runtime patch execution functionality of this disclosure.

FIG. 2 depicts the patch synthesis, which as noted preferably takes place offline and is used to create the intermediate bitcode used to patch the target process. This offline patch synthesis is shown in the left side in the drawing, and the runtime patch injection is shown on the right side. In particular, the patch synthesis step takes as inputs the patch source code 204 containing new implementations of functions to be replaced/added, and a metadata object. The metadata describes the patched functions in terms of name, argument types and return type. It also contains a description of patch dependencies, such as external libraries and linking type (static or dynamic) to inform the JIT (just-in-time) runtime of the appropriate strategy to compute symbol addresses for linking JIT-compiled patch functions to the target process. The application binary copy (including its symbol tables) 206 is also provided as a reference source. With this information, a JIT compiler 208 synthesizes the patch by compiling the patch source code to a bitcode representation 210, and it extracts a symbols map 212 from the symbol tables of the target binary copy. The bitcode representation 210 preferably is a typed, static-single-assignment intermediate representation. To complete the offline patch synthesis, a tracer component or tool 214 packs the patch bitcode 210, the symbols map 212, and a generic hooking agent 211 into a shared object (.so). The hooking agent 211 is a binary object tasked with hooking capabilities. As depicted, and as will be described in more detail below, the tracer component 214 injects a bootstrap 218 to launch a thread inside the process.

Figure 3:
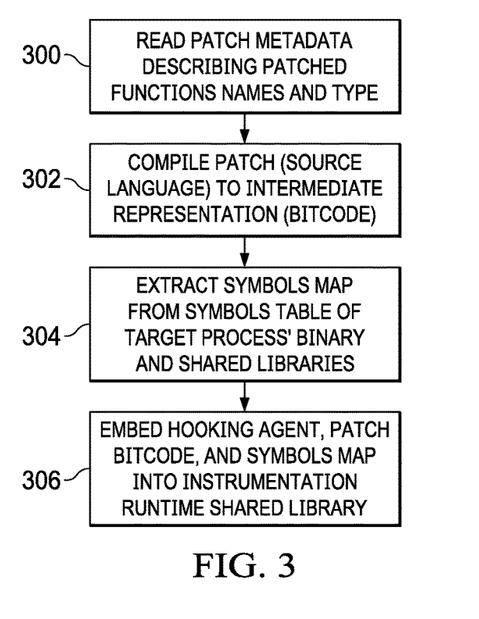
FIG. 3 depicts a high level process flow of an embodiment of an offline portion of the patch synthesis method of this disclosure.

Thus, and as depicted in a process flow in FIG. 3, the offline patch synthesis typically involves a patch compiler that parses and lowers the patch source code to bitcode, which is an intermediate representation amenable to just-in-time interpretation. Thus, at step 300, patch metadata is used to determine patch dependencies, functions to be patched, and symbols needed to dynamically link patched functions to the target process. At step 302, the patch is compiled. At step 304, the symbols map is extracted. At step 306, the tracer tool synthesizes a shared object containing the patch bitcode, a symbols map, and the hooking agent (the binary object tasked with hooking capabilities), and injects a launcher code to launch the hooking agent's thread.

Figure 4:
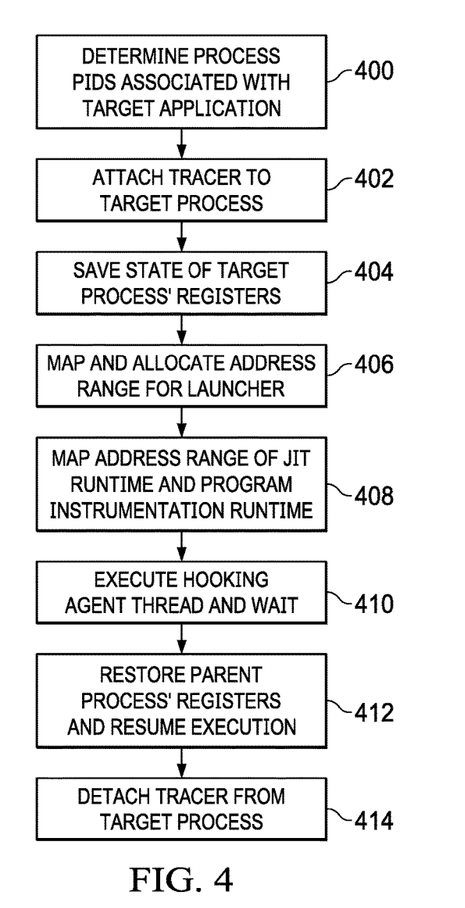
FIG. 4 depicts a high level process flow of an embodiment of the runtime patch injection method of this disclosure.

Thus, once patch synthesis completes, and referring back to FIG. 2, the tracer 214 injects the JIT (libjit) 220 and instrumentation (libsan) runtime 222 shared objects into the target process address space 225 (e.g., using a ptrace system call), and patches the target process. This dynamic patch injection is depicted in FIG. 4.

Figure 5:
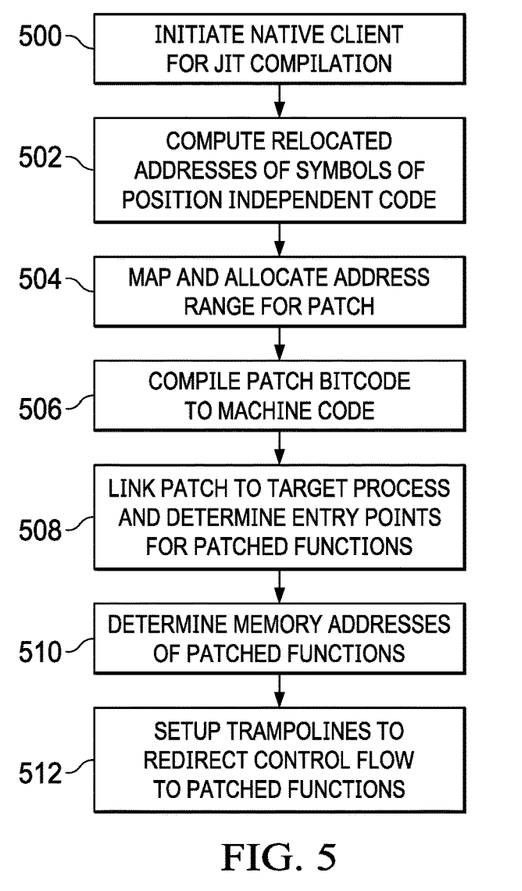
FIG. 5 depicts a high level process flow of an embodiment of a JIT compilation and linking process used to inject the JIT and instrumentation runtime shared objects into the target process address space, and to patch the target process.

In particular, the routine begins at step 400, wherein the tracer component 214 determines the process IDs associated with the target application 200. Then, for each process ID, at step 402 the tracer attaches to the target process and, at step 404, saves the state of the target process's registers. The tracer then maps the instrumentation runtime object into the target's address space at step 406 and, at step 408, it maps space for the bootstrap that is injected into the target process. At step 410, the target process is forced to execute the bootstrap, which in turn launches a separate thread. This is the JIT compilation and replacement thread described below in FIG. 5. That thread compiles the patch and executes functions that set the booby trap(s) in the application. After the thread is launched, at step 412 the tracer restores the target's registers to their original state. The tracer then detaches from the target process at step 414, and the process resumes. This completes the runtime (dynamic) patch injection process.

Figure 6:
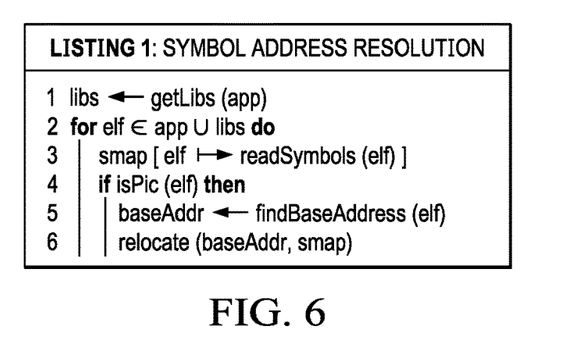
FIG. 6 depicts an algorithm for performing symbol address resolution implemented during the process flow in FIG. 5.

As mentioned above, the hooking agent thread performs the in-memory compilation and linking of patch code as well as sets up trampolines to replace target functions with patched ones. This is the thread used to compile and link the source code injected into the target process. To do so, the hooking agent preferably initializes a JIT compiler and computes the relocated addresses of dynamic symbols. The JIT compilation and linking process is depicted in the process flow shown in FIG. 5. At step 500, a native client for JIT compilation is initiated. At step 502, relocated addresses of symbols of position independent code are computed. This algorithm for performing symbol address resolution is shown in FIG. 6.

In particular, the algorithm that performs that computation first identifies all the libraries linked in the target process (line 1). If an application or library is position independent (lines 4-6), then the algorithm calculates its base address in the running process. Finally, the base address is added as an offset to each symbol in the symbol map (smap) that was created during the offline patch synthesis phase. Symbol resolution performed inside the target process address space in this manner is advantageous, as it ensures that the approach is impervious to address space layout resolution (ASLR) attack.

With symbol mapping complete, and referring back to FIG. 5, the JIT compiler maps and allocates the address range for the patch at step 504 and, at step 506, it compiles the patch bitcode to machine code, which is stored in memory. At step 508, the patch is then linked to the target process using the updated symbol map. At step 510, the memory addresses of the patched functions are determined and, at step 512, the trampoline(s) are setup to redirect control flow to the patched functions.

Figure 7:
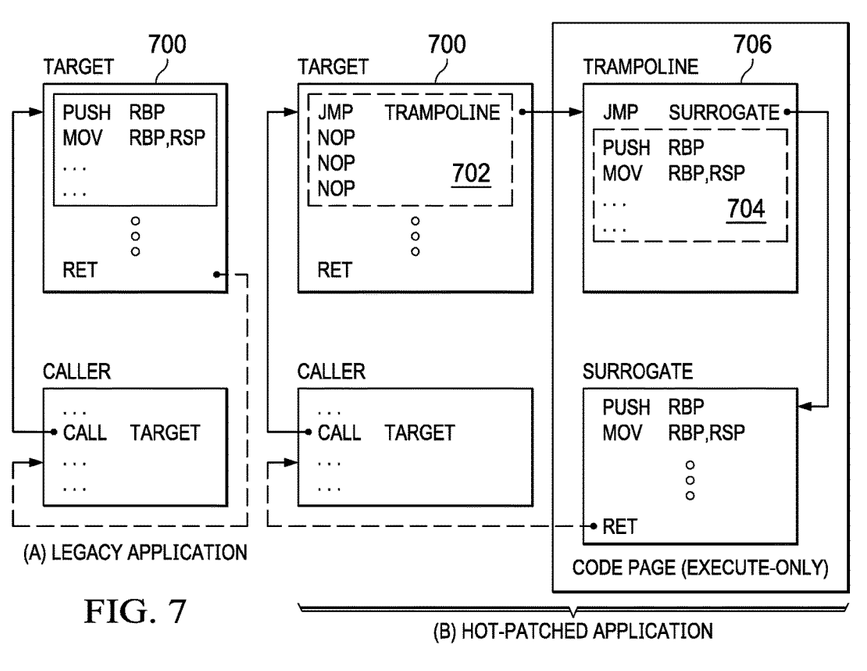
FIG. 7 depicts how a trampoline function modifies a target process to facilitate the deception deployment.

FIG. 7 depicts the trampoline function is additional detail with respect to a target function 700 in the target application. In computer programming, trampolines (sometimes referred to as indirect jump vectors) are memory locations holding addresses pointing to interrupt service routines, I/O routines, etc. Execution jumps into the trampoline and then immediately jumps out, or bounces, hence the term trampoline. To support function replacement for booby trapping, preferably the hooking agent writes a jump instruction 702 (followed by an aligning nop sled) at the entry point of the target function 700 that points to the corresponding patched function 704 using an intermediate trampoline 706. FIG. 7 in particular shows the before (a) and after (b) shots of replacing the target function with a JIT-compiled surrogate function using the trampoline. As can be seen, preferably the overwritten code section of the target function is appended to the trampoline, allowing the hooking agent to revert the trampoline readily as desired. As depicted, the booby-trapped function 704 preambles preferably are saved in an area adjacent the trampoline to facilitate later patch removal.

Figure 8:
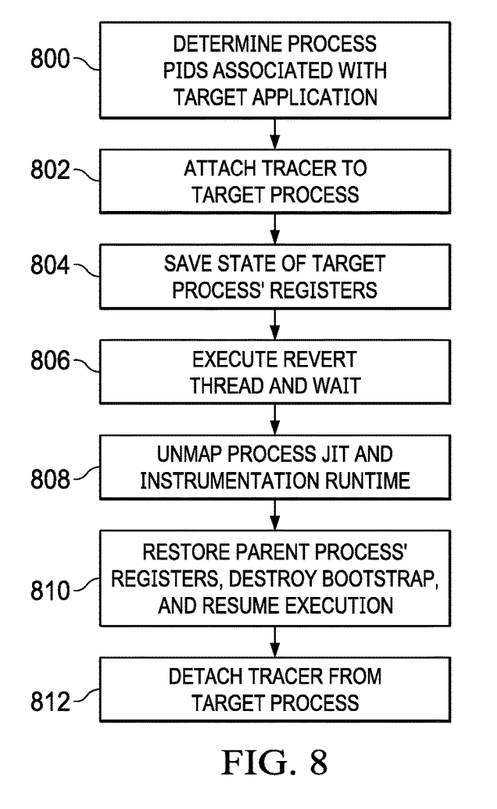
FIG. 8 is a process flow of de-instrumentation steps taken to unpatch the target process, remove the JIT and instrumentation runtimes, and cleanup the target process address space when the application deception is to be removed from the target process.

In particular, to perform process de-instrumentation (unpatching), the tracer preferably just does the reverse of the injection process. This operation is depicted in the process flow in FIG. 8. First, and at step 800, the tracer determines the process IDs associated with the target application. Then, for each process ID, at step 802 the tracer attaches to the target process and, at step 804, it saves the state of the target process's registers. At step 806, the tracer then triggers a hooking agent cleanup function in a separate thread to perform the patch unhooking and JIT runtime cleanup. Once the thread is completed, at step 808 the tracer signals the tracer to unmap the instrumentation runtime object from the target's address space; at step 810, the tracer deletes the bootstrap, and restores the target's registers. At step 812, the tracer then detaches from the target process, and the target process resumes execution.

Figure 9:
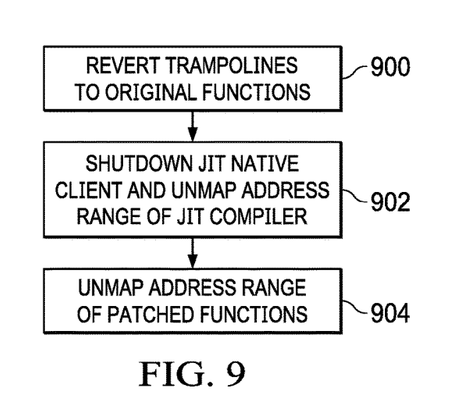
FIG. 9 is a process flow of further de-instrumentation steps and in particular steps taken to revert trampolines and shutdown the in-memory JIT compiler.

To revert the code trampolines and shutdown the in-memory JIT compiler, the hooking agent thread reverts all previously-created trampolines, as depicted in the process flow in FIG. 9. At step 900, the hooking agent replaces the indirect jumps (and associated nop sleds) located at the entry point of each target function with its original instructions (previously stored adjacent to the trampoline code). At step 902, it then shuts down the in-memory JIT compiler and unmaps it from the target process address space. Finally, and at step 904, the hooking agent also unmaps the address ranges corresponding to the patch code. Once removed, there is no trace of the booby traps to tip-off an attacker.

To facilitate application booby trapping, the deployment framework preferably utilizes an application programming interface (API) that enables users to define patch injection scripts, and to execute them on the hooking agent's thread inside the application address space. This API preferably is defined as follows:

compile (bc, symbols): compile bitcode bc in the target's address space run (fn, args): run a function fn in the target's address space replace (fn, fn'): replace fn with fn' in the target process The function "compile" is used to compile and link patches inside the target process. The function "run" executes the patched function in the target's address space; this is often used to change configurations inside the process. The replacement is done by calling the function "replace," which saves the original function preamble and sets a trampoline to the new function. Preferably, the framework embeds these user-defined scripts into the instrumentation runtime library, which uses a set of C-based stubs to interpret and execute them.

Figure 10:
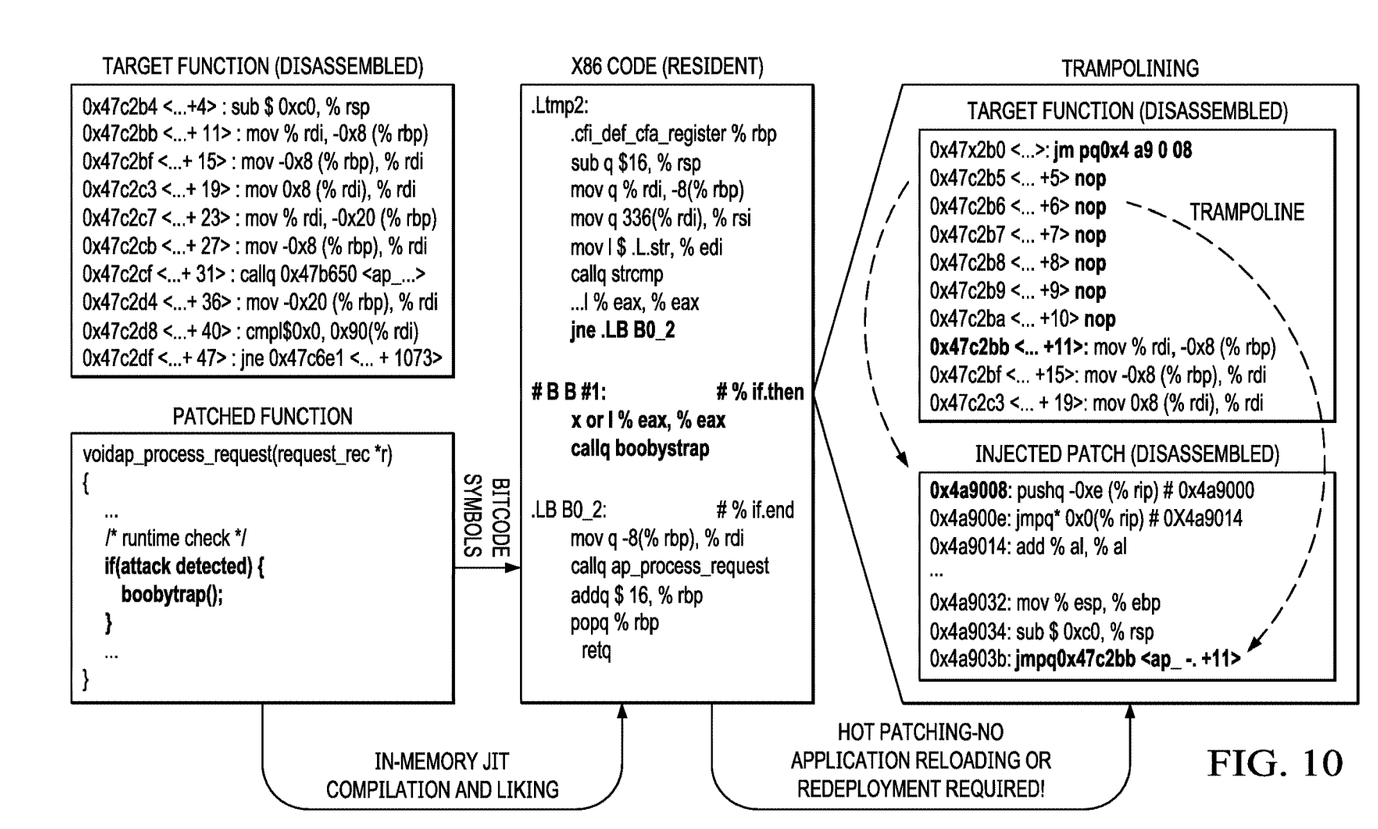
FIG. 10 depicts a representative patching of Apache HTTPD according to the techniques of this disclosure.

FIG. 10 depicts a representative patching of Apache HTTPD according to the technique that has been described above. In this example, target function ap_process_request is disassembled and shown in the left. An updated implementation (i.e., the patch) is provided along with its metadata containing patch dependencies (i.e., headers containing Apache's data structures) and target function type (i.e., {request_rec}□void). These are fed into the patch compiler, which lowers the source code to bitcode. The in-memory JIT runtime then compiles the produced bitcode to the target architecture (e.g., x86) and stores the compiled function in the process address space. Finally, the hooking agent replaces the original function with the newly-patched function via trampolines set as jump instructions injected at an ap_process_request function entry point.

While preferred, it is not required that the replacement function actually include the deception itself. The replacement function may simply perform a task to check a certain condition or state (e.g., that in turn defines the booby trap). That condition or state may vary including, without limitation, termination of the application, termination of the network connection, some other response, and so forth.

Benefits and Advantages

Summarizing, this disclosure provides a framework for the rapid deployment of booby traps into running legacy processes across an enterprise network. By injecting and compiling code inside the running process (preferably on a just-in-time basis), the approach can be used to provide deceptions that can notify security analysts of attacks, and confuse adversaries with active responses, such as providing misinformation or forcing the attacker into a sandbox. To facilitate forensic activity, the approach also provides for a sandbox architecture, preferably based on Linux namespaces, that is or can be deployed throughout the network, and that is used to transparently envelope attacked processes for further monitoring.

More generally, by providing for just-in-time code injection for active cyber detection and response in the manner described, the techniques herein provide a solution for cyber security professionals who currently suffer from a drastic information imbalance. Computer networks, servers, and services expose tremendous amounts of information about their security postures, greatly benefiting attackers during reconnaissance incursions. Defenders, in contrast, obtain only minimal insights into attacker activities, especially after successful exploits. To reverse this asymmetry, the above-described deployment model is provided to facilitate: (1) the rapid injection of on-demand booby traps into live, commodity applications without disruption of production workflows, and (2) the transparent sandboxing of suspicious processes for counter-reconnaissance and threat information gathering. The techniques described enable a large variety of novel deception and defense scenarios, including the placement of cyber traps into production workloads to turn them into application-level honeypots, dynamic deployment of hot honey-patches, and deceptive hot-hardening. The approach is practical and incurs minimal runtime overheads.

The approach provides for rapid deployments of application-level deceptions (i.e., booby traps) to implant cyber deceptions into running legacy applications—both on production and decoy systems—with no downtime and minimal performance overhead compared with the original application. More generally, the techniques described herein integrate deceptive capabilities into information systems with genuine production value (e.g., servers and software that offer genuine services to legitimate users).

Application-level deceptions overcome the deficiencies because they can be deployed on production servers using real applications, and real data. The approach herein levels the cyberspace battlefield by weaponizing the very applications under attack to (1) confuse and deter attackers by creating application-level software deceptions and (2) inform defenders of the presence and activities of attackers. Application-level deceptive capabilities such as described herein are particularly advantageous as they offer critical mediation capabilities between the network, endpoint, and data deception layers of the deception stack. For example, an application-level, deception-enabled web server can instruct network-level IDSes to allow certain payloads to reach the application layer, where it can then offer deceptive responses that misdirect the adversary into interacting with decoys within the endpoint layer, all while the adversary is left believing he is interacting with the real production application. These decoys appeal to the data deception layer to purvey disinformation in the form of false secrets or even malware counter-attacks against adversaries. The approach herein provides tools and techniques allowing organizations to engineer applications with proactive and deceptive capabilities that degrade attackers' methods and disrupt their reconnaissance efforts.

The techniques herein advantageously enabling embedding cyber traps into commercial off-the-shelf (COTS) applications and thereby provides new vantage points for security analysts to identify threats and gain attack insights. Deceptions are purveyed via genuine applications and services, and not merely some ad hoc decoy. The approach provides a significantly lower barrier to deployment of high-interaction deceptions with little or no zero false positives. The approach has wide applicability, e.g., for early attack alerting and logging, attacker sandboxing for attribution and forensics, automated synthesis of high-interaction honeypots.

In summary, a first aspect of this disclosure thereby enables (i) on-demand, dynamic legacy application booby trapping, coupled with (ii) reversible, (iii) dynamic patching for legacy processes, preferably with resident (in-memory) patch synthesis and injection. If active analysis is then desired, a second aspect of this disclosure provides for a lightweight and low overhead application sandboxing approach that enables monitoring and analysis of attacks as they occur.

Enabling Technologies

Figure 11:
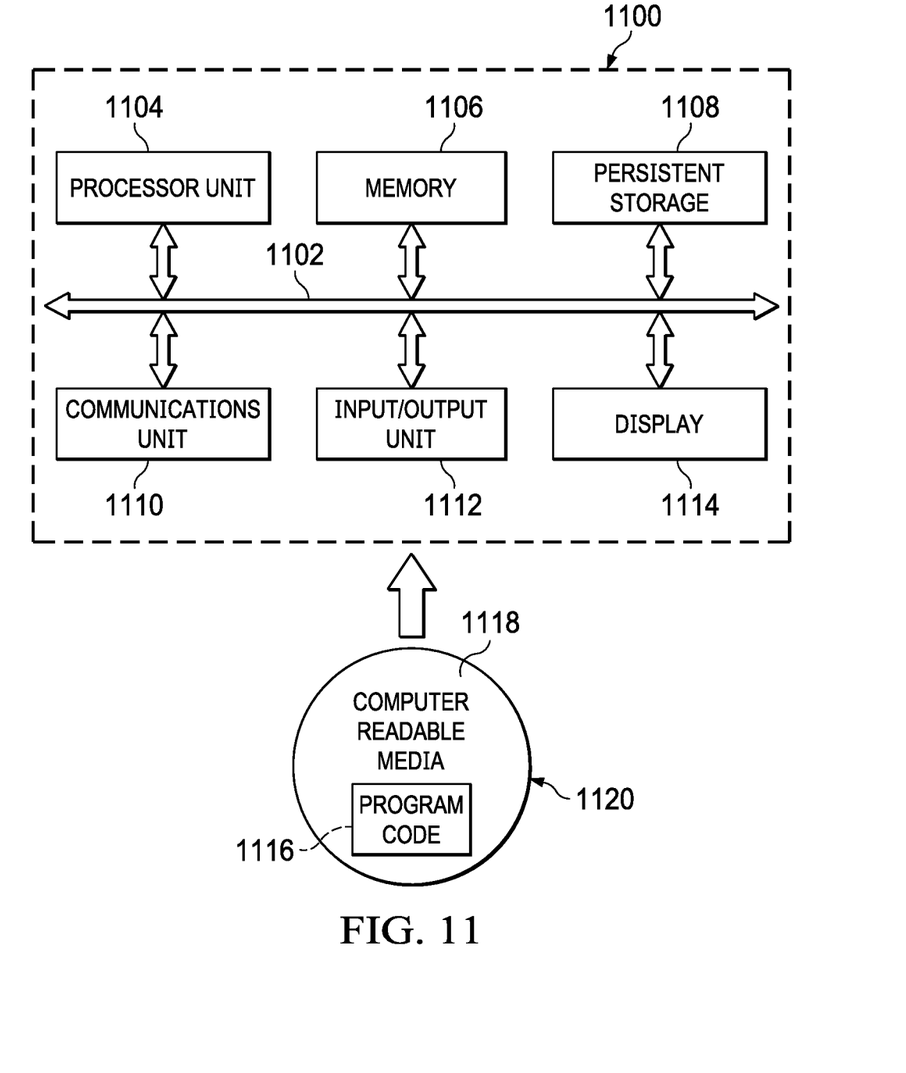
FIG. 11 is a block diagram of a data processing system in which exemplary aspects of the illustrative embodiments may be implemented.

FIG. 11 is a block diagram of a data processing system in which exemplary aspects of the illustrative embodiments may be implemented. Data processing system 1100 is an example of a computer in which computer usable code or instructions implementing the processes for illustrative embodiments of the disclosure may be located. In this illustrative example, data processing system 1100 includes communications fabric 1102, which provides communications between processor unit 1104, memory 1106, persistent storage 1108, communications unit 1110, input/output (I/O) unit 1112, and display 1114.

Processor unit 1104 serves to execute instructions for software that may be loaded into memory 1106. Processor unit 1104 may be a set of one or more processors or may be a multi-processor core, depending on the particular implementation. Further, processor unit 1104 may be implemented using one or more heterogeneous processor systems in which a main processor is present with secondary processors on a single chip. As another illustrative example, processor unit 1104 may be a symmetric multi-processor (SMP) system containing multiple processors of the same type.

Memory 1106 and persistent storage 1108 are examples of storage devices. A storage device is any piece of hardware that is capable of storing information either on a temporary basis and/or a permanent basis. Memory 1106, in these examples, may be, for example, a random access memory or any other suitable volatile or non-volatile storage device. Persistent storage 1108 may take various forms depending on the particular implementation. For example, persistent storage 1108 may contain one or more components or devices. For example, persistent storage 1108 may be a hard drive, a flash memory, a rewritable optical disk, a rewritable magnetic tape, or some combination of the above. The media used by persistent storage 1108 also may be removable. For example, a removable hard drive may be used for persistent storage 1108.

Communications unit 1110, in these examples, provides for communications with other data processing systems or devices. In these examples, communications unit 1110 is a network interface card. Communications unit 1110 may provide communications through the use of either or both physical and wireless communications links.

Input/output unit 1112 allows for input and output of data with other devices that may be connected to data processing system 1100. For example, input/output unit 1112 may provide a connection for user input through a keyboard and mouse. Further, input/output unit 1112 may send output to a printer. Display 1114 provides a mechanism to display information to a user.

Instructions for the operating system and applications or programs are located on persistent storage 1108. These instructions may be loaded into memory 1106 for execution by processor unit 1104. The processes of the different embodiments may be performed by processor unit 1104 using computer implemented instructions, which may be located in a memory, such as memory 1106. These instructions are referred to as program code, computer-usable program code, or computer-readable program code that may be read and executed by a processor in processor unit 1104. The program code in the different embodiments may be embodied on different physical or tangible computer-readable media, such as memory 1106 or persistent storage 1108.

Program code 1111 is located in a functional form on computer-readable media 1118 that is selectively removable and may be loaded onto or transferred to data processing system 1100 for execution by processor unit 1104. Program code 1111 and computer-readable media 1118 form computer program product 1120 in these examples. In one example, computer-readable media 1118 may be in a tangible form, such as, for example, an optical or magnetic disc that is inserted or placed into a drive or other device that is part of persistent storage 1108 for transfer onto a storage device, such as a hard drive that is part of persistent storage 1108. In a tangible form, computer-readable media 1118 also may take the form of a persistent storage, such as a hard drive, a thumb drive, or a flash memory that is connected to data processing system 1100. The tangible form of computer-readable media 1118 is also referred to as computer-recordable storage media. In some instances, computer-recordable media 1118 may not be removable.

Alternatively, program code 1111 may be transferred to data processing system 1100 from computer-readable media 1118 through a communications link to communications unit 1110 and/or through a connection to input/output unit 1112. The communications link and/or the connection may be physical or wireless in the illustrative examples. The computer-readable media also may take the form of non-tangible media, such as communications links or wireless transmissions containing the program code. The different components illustrated for data processing system 1100 are not meant to provide architectural limitations to the manner in which different embodiments may be implemented. The different illustrative embodiments may be implemented in a data processing system including components in addition to or in place of those illustrated for data processing system 1100. Other components shown in FIG. 11 can be varied from the illustrative examples shown. As one example, a storage device in data processing system 1100 is any hardware apparatus that may store data. Memory 1106, persistent storage 1108, and computer-readable media 1118 are examples of storage devices in a tangible form.

In another example, a bus system may be used to implement communications fabric 1102 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 1106 or a cache such as found in an interface and memory controller hub that may be present in communications fabric 1102.

Computer program code for carrying out operations of the present invention may be written in any combination of one or more programming languages, including an object-oriented programming language such as Java™, Smalltalk, C++ or the like, functional programming languages such as SML, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Those of ordinary skill in the art will appreciate that the hardware in FIG. 11 may vary depending on the implementation. Other internal hardware or peripheral devices, such as flash memory, equivalent non-volatile memory, or optical disk drives and the like, may be used in addition to or in place of the hardware depicted in FIG. 11. Also, the processes of the illustrative embodiments may be applied to a multiprocessor data processing system, other than the SMP system mentioned previously, without departing from the spirit and scope of the disclosed subject matter.

The techniques herein may be used with a host machine (or set of machines, e.g., running a cluster) operating in a standalone manner, or in a networking environment such as a cloud computing environment. Cloud computing is an information technology (IT) delivery model by which shared resources, software and information are provided over the Internet to computers and other devices on-demand. With this approach, an application instance is hosted and made available from Internet-based resources that are accessible through a conventional Web browser or mobile application over HTTP. Cloud compute resources are typically housed in large server farms that run one or more network applications, typically using a virtualized architecture wherein applications run inside virtual servers, or so-called "virtual machines" (VMs), that are mapped onto physical servers in a data center facility. The virtual machines typically run on top of a hypervisor, which is a control program that allocates physical resources to the virtual machines.

Typical cloud computing service models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Typical deployment models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

Some clouds are based upon non-traditional IP networks. Thus, for example, a cloud may be based upon two-tier CLOS-based networks with special single layer IP routing using hashes of MAC addresses. The techniques described herein may be used in such non-traditional clouds.

Figure 12:
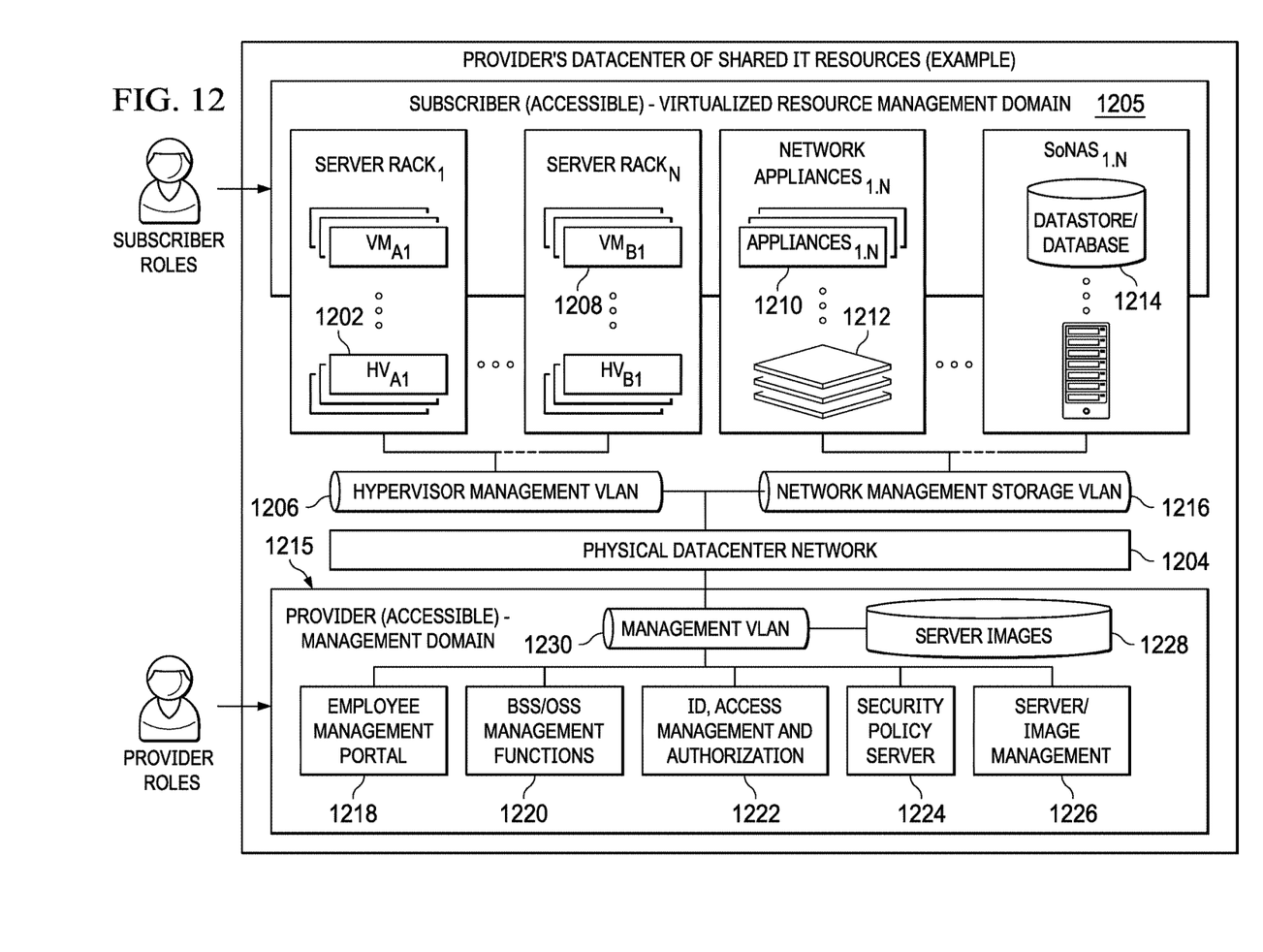
FIG. 12 depicts a representative cloud computing environment in which exemplary aspect of this disclosure may be implemented.

FIG. 12 illustrates a typical Information Technology (IT) infrastructure that supports virtualization of resources and in which the described techniques of this disclosure may be implemented. In this example, the IT datacenter that provides shared (public) resources is the "provider" and a customer or company that uses these shared resources to host, store and manage its data and applications (in all forms) is the "subscriber" (or "customer" or "tenant"). In FIG. 12, an example virtual machine hosting environment (alternately referred to herein as a data center or "cloud") is illustrated. This environment comprises host machines (HVs) 1202 (e.g., servers or like physical machine computing devices) connected to a physical datacenter network 1204, typically via a hypervisor management VLAN 1206. Although not depicted explicitly, typically the environment also includes load balancers, network data switches (e.g., top-of-rack switches), firewalls, and the like. As shown in FIG. 12, physical servers 1202 are each adapted to dynamically provide one or more virtual machines (VMs) 1208 using virtualization technology. Such technology is available commercially, e.g., from VMware® or others. Server virtualization is a technique that is well-known in the art. As depicted, multiple VMs can be placed into a single host machine and share the host machine's CPU, memory and other resources, thereby increasing the utilization of an organization's data center. In this environment, tenant applications 1210 are hosted in network appliances 1212, and tenant data is stored in data stores and databases 1214. The applications and data stores are connected to the physical datacenter network 1204, typically via a network management/storage VLAN 1211. Collectively, the virtual machines, applications and tenant data represent a subscriber-accessible virtualized resource management domain 1205. Through this domain, the subscriber's employees may access and manage (using various role-based privileges) virtualized resources they have been allocated by the provider and that are backed by physical IT infrastructure. The bottom portion of the infrastructure illustrates a provider-accessible management domain 1215. This domain comprises a provider employee management portal 1218, business support services (BSS) and operational support services (OSS) management functions 1220, various identity and access management functions 1222, a security policy server 1224, and management functions 1226 to manage the server images 1228. These functions interface to the physical datacenter network via a management VLAN 1230.

Generalizing, the cloud computing infrastructure provides for a virtual machine hosting environment that comprises host machines (e.g., servers or like physical machine computing devices) connected via a network and one or more management servers. Typically, the physical servers are each adapted to dynamically provide one or more virtual machines using virtualization technology, such as VMware ESX/ESXi. Multiple VMs can be placed into a single host machine and share the host machine's CPU, memory and other resources, thereby increasing the utilization of an organization's data center. In a non-limiting implementation, representative platform technologies are, without limitation, IBM System x® servers with VMware vSphere 4.1 Update 1 and 5.0.

In a representative container cloud compute environment, a host executes an operating system (OS), such as the Linux kernel. Containers refers to an operating-system-level virtualization method for running multiple isolated computing workloads (containers) on a control host using a single operating system kernel. The approach effectively partitions the resources managed by the single operating system into isolated groups to better balance the conflicting demands on resource usage between the isolated groups. In contrast to virtualization, neither instruction-level emulation nor just-in-time compilation is required. In addition, containers can run instructions native to the core CPU without any special interpretation mechanisms. By providing a way to create and enter containers, an operating system gives applications the illusion of running on a separate machine while at the same time sharing many of the underlying resources.

As noted above, the Linux kernel also has a feature referred to as Namespaces. As described, the technique of this disclosure preferably is implemented within the operating system kernel itself using this facility. While this is a preferred implementation strategy, it is not necessarily limiting, as the described technique(s) might also be implemented as one or more applications (whether in user space or otherwise). Generalizing, one of ordinary skill in the art will recognize that the above-described JIT application deception deployment and sandboxing techniques may be implemented (as a product or service) either in a standalone manner, or within or in association with a cloud platform system or appliance, or using any other type of cloud management systems, products, devices, programs or processes.

As previously noted, the above-described components typically are each implemented as software, i.e., as a set of computer program instructions executed in one or more hardware processors. As has been described, the components are shown as distinct, but as noted this is not a requirement, as the components may also be integrated with one another in whole or in part. One or more of the components may execute in a dedicated location, or remote from one another. One or more of the components may have sub-components that execute together to provide the functionality. There is no requirement that particular functions be executed by a particular component as named above, as the functionality herein (or any aspect thereof) may be implemented in other or systems.

The approach may be implemented by any service provider that operates infrastructure. It may be available as a managed service, e.g., provided by a cloud service.

The components may implement the workflow synchronously or asynchronously, continuously and/or periodically.

The approach may be integrated with other enterprise- or network-based security methods and systems, such as in a STEM, or the like.

The functionality described in this disclosure may be implemented in whole or in part as a standalone approach, e.g., a software-based function executed by a hardware processor, or it may be available as a managed service (including as a web service via a SOAP/XML interface). The particular hardware and software implementation details described herein are merely for illustrative purposes are not meant to limit the scope of the described subject matter.

More generally, computing devices within the context of the disclosed subject matter are each a data processing system (such as shown in FIG. 2) comprising hardware and software, and these entities communicate with one another over a network, such as the Internet, an intranet, an extranet, a private network, or any other communications medium or link. The applications on the data processing system provide native support for Web and other known services and protocols including, without limitation, support for HTTP, FTP, SMTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP, FTP, SMTP and XML is available from Internet Engineering Task Force (IETF). Familiarity with these known standards and protocols is presumed.

Aspects of this disclosure may be implemented in or in conjunction with various server-side architectures including simple n-tier architectures, web portals, federated systems, and the like. The techniques herein may be practiced in a loosely-coupled server (including a "cloud"-based) environment.

Still more generally, the subject matter described herein can take the form of an entirely hardware embodiment, an entirely software embodiment or an embodiment containing both hardware and software elements. In a preferred embodiment, the function is implemented in software, which includes but is not limited to firmware, resident software, microcode, and the like. Furthermore, as noted above, the identity context-based access control functionality can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or a semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. The computer-readable medium is a tangible item.

The computer program product may be a product having program instructions (or program code) to implement one or more of the described functions. Those instructions or code may be stored in a computer readable storage medium in a data processing system after being downloaded over a network from a remote data processing system. Or, those instructions or code may be stored in a computer readable storage medium in a server data processing system and adapted to be downloaded over a network to a remote data processing system for use in a computer readable storage medium within the remote system.

In a representative embodiment, the knowledge graph generation and processing techniques are implemented in a special purpose computer, preferably in software executed by one or more processors. The software is maintained in one or more data stores or memories associated with the one or more processors, and the software may be implemented as one or more computer programs. Collectively, this special-purpose hardware and software comprises the functionality described above.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

The target live application is any executing process, program, network service, module, or other computational component or system.

The techniques herein may be practiced as well with non-live applications, e.g., to facilitate development, debugging, testing or other operational or forensic analysis.

The techniques herein improve computing functioning by providing JIT provisioning, detection, monitoring and analysis of attacks as they occur in computing systems more efficiently and without the significant overhead required of current state-of-the art approaches. Computing systems that incorporate the techniques herein provide these advantages transparently and without disruption of application workflow, thereby increasing the reliability and availability of the underlying computer system. Computer systems implemented with the approach herein operate more efficiently and with less cyber security-specific processing and storage requirements than they would otherwise.

The nomenclature used herein also should not be taken to be limiting.

The invention claimed is:

1. A method for cyber security, comprising:
    on-demand, injecting a deception patch into a memory space of a production application that is running, the production application having an execution flow;
    in-memory compiling the deception patch into native code on a separate execution thread inside the production application;
    in the separate execution thread, setting a booby trap as a replacement function for an original function in the production application, the replacement function performing one or more tasks of the original function and including at least one deception; and
    responsive to detecting an attack on the production application by an action that trips the booby trap, initiating a defined response.

2. The method as described in claim 1 wherein the defined response is one of: a passive response, and an active response.

3. The method as described in claim 2 wherein the passive response is one of: terminating a connection, collecting an attack payload, and issuing a notification.

4. The method as described in claim 2 wherein the active response is one of: transparently moving a current execution thread into a decoy sandbox for further execution and analysis, providing disinformation, and activating rule to block the attack.

5. The method as described in claim 1 further including removing the replacement function while the production application is running.

6. The method as described in claim 1 wherein the deception patch is synthesized in an off-line process by:
    receiving patch source code, and a symbol table associated with the production application;
    compiling the patch source code into bitcode suitable for just-in-time in-memory interpretation;
    extracting a symbols map from the symbol table; and
    packing into a shared object the bitcode, the symbols map and a hooking agent, the shared object being the deception patch.

7. The method as described in claim 6 wherein compiling the deception patch further includes compiling the bitcode, and linking against global symbols of the production application using the symbol map.

8. An apparatus for cyber security, comprising:
    a processor;
    computer memory holding computer program instructions executed by the processor, the computer program instructions operative to:
        on-demand, inject a deception patch into a memory space of a production application that is running, the production application having an execution flow;
        in-memory compile the deception patch into native code on a separate execution thread inside the production application;
        in the separate execution thread, set a booby trap as a replacement function for an original function in the production application, the replacement function configured to perform one or more tasks of the original function and including at least one deception; and
        responsive to detecting an attack on the production application by an action that trips the booby trap, initiate a defined response.

9. The apparatus as described in claim 8 wherein the defined response is one of: a passive response, and an active response.

10. The apparatus as described in claim 9 wherein the passive response is one of: terminating a connection, collecting an attack payload, and issuing a notification.

11. The apparatus as described in claim 9 wherein the active response is one of: transparently moving a current execution thread into a decoy sandbox for further execution and analysis, providing disinformation, and activating rule to block the attack.

12. The apparatus as described in claim 8 wherein the computer program instructions are further operative to remove the replacement function while the production application is running.

13. The apparatus as described in claim 8 wherein the deception patch is synthesized in an off-line process, the off-line process including computer program instructions operative to:
    receive patch source code, and a symbol table associated with the production application;
    compile the patch source code into bitcode suitable for just-in-time in-memory interpretation;
    extract a symbols map from the symbol table; and
    pack into a shared object the bitcode, the symbols map and a hooking agent, the shared object being the deception patch.

14. The apparatus as described in claim 13 wherein the computer program instructions operative to compile the deception patch are operative to compile the bitcode, and to link against global symbols of the production application using the symbol map.

15. A computer program product in a non-transitory computer readable medium, the computer program product holding computer program instructions executed by a host machine for cyber security, the computer program instructions comprising program code operative to:

on-demand, inject a deception patch into a memory space of a production application that is running, the production application having an execution flow;

in-memory compile the deception patch into native code on a separate execution thread inside the production application;

in the separate execution thread, set a booby trap as a replacement function for an original function in the production application, the replacement function configured to perform one or more tasks of the original function and including at least one deception; and     responsive to detecting an attack on the production application by an action that trips the booby trap, initiate a defined response.

16. The computer program product as described in claim 15 wherein the defined response is one of: a passive response, and an active response.

17. The computer program product as described in claim 16 wherein the passive response is one of: terminating a connection, collecting an attack payload, and issuing a notification.

18. The computer program product as described in claim 16 wherein the active response is one of: transparently moving a current execution thread into a decoy sandbox for further execution and analysis, providing disinformation, and activating rule to block the attack.

19. The computer program product as described in claim 15 wherein the computer program instructions are further operative to remove the replacement function while the production application is running.

20. The computer program product as described in claim 15 wherein the deception patch is synthesized in an off-line process, the off-line process including computer program instructions operative to:

receive patch source code, and a symbol table associated with the production application;

compile the patch source code into bitcode suitable for just-in-time in-memory interpretation;

extract a symbols map from the symbol table; and pack into a shared object the bitcode, the symbols map and a hooking agent, the shared object being the deception patch.

21. The computer program product as described in claim 20 wherein the computer program instructions operative to compile the deception patch are operative to compile the bitcode, and to link against global symbols of the production application using the symbol map.

22. A method for cyber security, comprising:

just-in-time deploying into a running target application a software patch having associated therewith at least one application-level deception, wherein deploying the software patch instantiates in a separate execution thread a replacement function configured to perform one or more tasks of the running target application, the replacement function further including a task to check for a given condition associated with the at least one application-level deception;

responsive to detection of the given condition, initiating a defined response; and     selectively removing the software patch from the running target application.

\* \* \* \* \*